United States Patent
Goel et al.

(10) Patent No.: US 9,264,887 B2
(45) Date of Patent: Feb. 16, 2016

(54) SYSTEMS AND METHODS FOR ENHANCED SYSTEM INFORMATION DECODING

(71) Applicant: QUALCOMM Incorporated, San Diego, CA (US)

(72) Inventors: Neha Goel, Surrey (GB); Chetan Gopalakrishnan Chakravarthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 14/310,807

(22) Filed: Jun. 20, 2014

(65) Prior Publication Data
US 2015/0373531 A1    Dec. 24, 2015

(51) Int. Cl.
| H04W 4/00 | (2009.01) |
| H04W 8/18 | (2009.01) |
| H04W 60/00 | (2009.01) |
| H04L 12/851 | (2013.01) |
| H04W 88/06 | (2009.01) |

(52) U.S. Cl.
CPC ............. *H04W 8/186* (2013.01); *H04L 47/245* (2013.01); *H04W 60/005* (2013.01); *H04W 8/18* (2013.01); *H04W 88/06* (2013.01)

(58) Field of Classification Search
CPC ... H04W 8/186; H04W 60/005; H04W 88/06; H04W 8/18; H04L 47/245
See application file for complete search history.

(56) References Cited

U.S. PATENT DOCUMENTS

| 8,379,567 B2 | 2/2013 | Cho et al. |
| 2003/0181216 A1 | 9/2003 | Tsai et al. |
| 2009/0262693 A1 | 10/2009 | Wang et al. |
| 2009/0274086 A1 | 11/2009 | Petrovic et al. |
| 2012/0149361 A1* | 6/2012 | Esch ................ H04W 48/12 455/422.1 |
| 2013/0042251 A1* | 2/2013 | Nader ................ G06F 9/4881 718/103 |
| 2013/0157662 A1* | 6/2013 | Han ................ H04W 48/18 455/436 |
| 2013/0295920 A1* | 11/2013 | Viswanadham ...... H04W 36/14 455/426.1 |
| 2013/0303203 A1* | 11/2013 | Wang ................ H04W 68/00 455/458 |
| 2013/0303240 A1 | 11/2013 | Sanka et al. |

(Continued)

FOREIGN PATENT DOCUMENTS

| EP | 2605562 A2 | 6/2013 |
| WO | WO-2013035065 A1 | 3/2013 |

OTHER PUBLICATIONS

3GPP TS 45.002 V12.1.0 (Nov. 2013) 3rd Generation Partnership Project; Technical Specification Group GSM/EDGE Radio Access Network; Multiplexing and multiple access on the radio path (Release 12), 117 pages.

(Continued)

*Primary Examiner* — Clemence Han
(74) *Attorney, Agent, or Firm* — Austin Rapp & Hardman

(57) ABSTRACT

Embodiments of the present invention include devices, systems and methods for enhanced system information decoding. For example, a method for wireless communication by a multi-SIM wireless communication device is described. The method includes determining time codes (TC) associated with system information (SI) messages for a first subscription. The method also includes determining that multiple SI messages for the first subscription are being sent on the same TC. The method further includes prioritizing decoding the SI messages for the first subscription when activity of an additional subscription can be preempted. Other aspects, embodiments, and features are also claimed and described.

30 Claims, 8 Drawing Sheets

(56) References Cited

U.S. PATENT DOCUMENTS

| | | | |
|---|---|---|---|
| 2014/0086112 A1 | 3/2014 | Stern-Berkowitz et al. | |
| 2014/0146732 A1* | 5/2014 | Olufunmilola et al. | H04W 24/10 370/311 |
| 2014/0169347 A1* | 6/2014 | Lamazure | H04B 17/382 370/337 |
| 2015/0056988 A1* | 2/2015 | Goel | H04W 60/005 455/434 |
| 2015/0065132 A1* | 3/2015 | Ramkumar | H04W 52/0241 455/435.3 |
| 2015/0099528 A1* | 4/2015 | Hu | H04L 5/00 455/452.1 |
| 2015/0201398 A1* | 7/2015 | Dhanda | H04W 36/0016 455/437 |
| 2015/0215860 A1* | 7/2015 | Akkapally | H04W 48/20 455/452.2 |
| 2015/0271724 A1* | 9/2015 | Kotreka | H04W 74/0833 370/331 |

OTHER PUBLICATIONS

About the GSM-Dm-Channels, Humboldt University, Berlin, Jul. 2009, pp. 1-84.

International Search Report and Written Opinion—PCT/US2015/035309—ISA/EPO—Oct. 12, 2015.

* cited by examiner

SYSTEMS AND METHODS FOR ENHANCED SYSTEM INFORMATION DECODING

TECHNICAL FIELD

The technology discussed below relates generally to communication systems, and more specifically to systems and methods for enhanced system information decoding. Implementation of certain aspects of the technology discussed below can enable improved communication network selection and efficient use of power resources.

BACKGROUND

Wireless communication systems have become an important means by which many people worldwide have come to communicate. A wireless communication system may provide communication for a number of wireless communication devices, each of which may be serviced by a base station.

In the last several decades, the use of wireless communication devices has become common. In particular, advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices.

As wireless communication devices have become more widely deployed, the number of communication systems available has also increased. Inefficiencies may arise when scanning for communication systems. Accordingly, systems and methods that may help to reduce these inefficiencies may be beneficial.

BRIEF SUMMARY OF SOME EXAMPLES

Embodiments of the present invention address the above issues as well as others. Indeed, embodiments of the present invention provide power efficient devices, systems, and methods that can alleviate time delays. Doing so can not only utilize power resources efficiently but can aid in minimizing delays associated with network communications.

A method for wireless communication by a multi-subscriber identity module (SIM) wireless communication device is described. The method includes determining time codes (TC) associated with system information (SI) messages for a first subscription. The method also includes determining that multiple SI messages for the first subscription are being sent on the same TC. The method additionally includes prioritizing decoding the SI messages for the first subscription when activity of an additional subscription can be preempted.

Prioritizing decoding the SI messages for the first subscription may include performing four consecutive decodes of the same TC by the first subscription before performing the activity of the additional subscription.

The method may also include determining whether the activity of the additional subscription can be preempted. Determining whether the activity of the additional subscription can be preempted may include determining whether the additional subscription is performing a lower priority activity than decoding SI messages. The lower priority activity may include at least one of a synchronization channel (SCH) read, a broadcast control channel (BCCH) read, a paging channel (PCH) read or neighbor cell acquisition.

When the additional subscription is performing a higher priority activity than decoding SI messages, the method may further include increasing a system information timer to accommodate four consecutive decodes of the same TC by the first subscription after completion of the higher priority activity by the additional subscription. The higher priority activity may include at least one of a location area update (LAU) and a routing area update (RAU).

The wireless communication device may be a multi-SIM multi standby device. The first subscription may be associated with one SIM and the additional subscription may be associated with an additional SIM. Each subscription may share a single radio frequency (RF) resource. The first subscription may be in a system information acquisition state.

An apparatus for wireless communication is also described. The apparatus includes a processor, memory in electronic communication with the processor and instructions stored in the memory. The apparatus determines TCs associated with SI messages for a first subscription. The apparatus also determines that multiple SI messages for the first subscription are being sent on the same TC. The apparatus further prioritizes decoding the SI messages for the first subscription when activity of an additional subscription can be preempted.

A wireless device is also described. The wireless device includes means for determining TCs associated with SI messages for a first subscription. The wireless device also includes means for determining that multiple SI messages for the first subscription are being sent on the same TC. The wireless device further includes means for prioritizing decoding the SI messages for the first subscription when activity of an additional subscription can be preempted.

A computer-program product for wireless communications is also described. The computer-program product includes a non-transitory computer-readable medium having instructions thereon. The instructions include code for causing a wireless communication device to determine TCs associated with SI messages for a first subscription. The instructions also include code for causing the wireless communication device to determine that multiple SI messages for the first subscription are being sent on the same TC. The instructions further include code for causing the wireless communication device to prioritize decoding the SI messages for the first subscription when activity of an additional subscription can be preempted.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
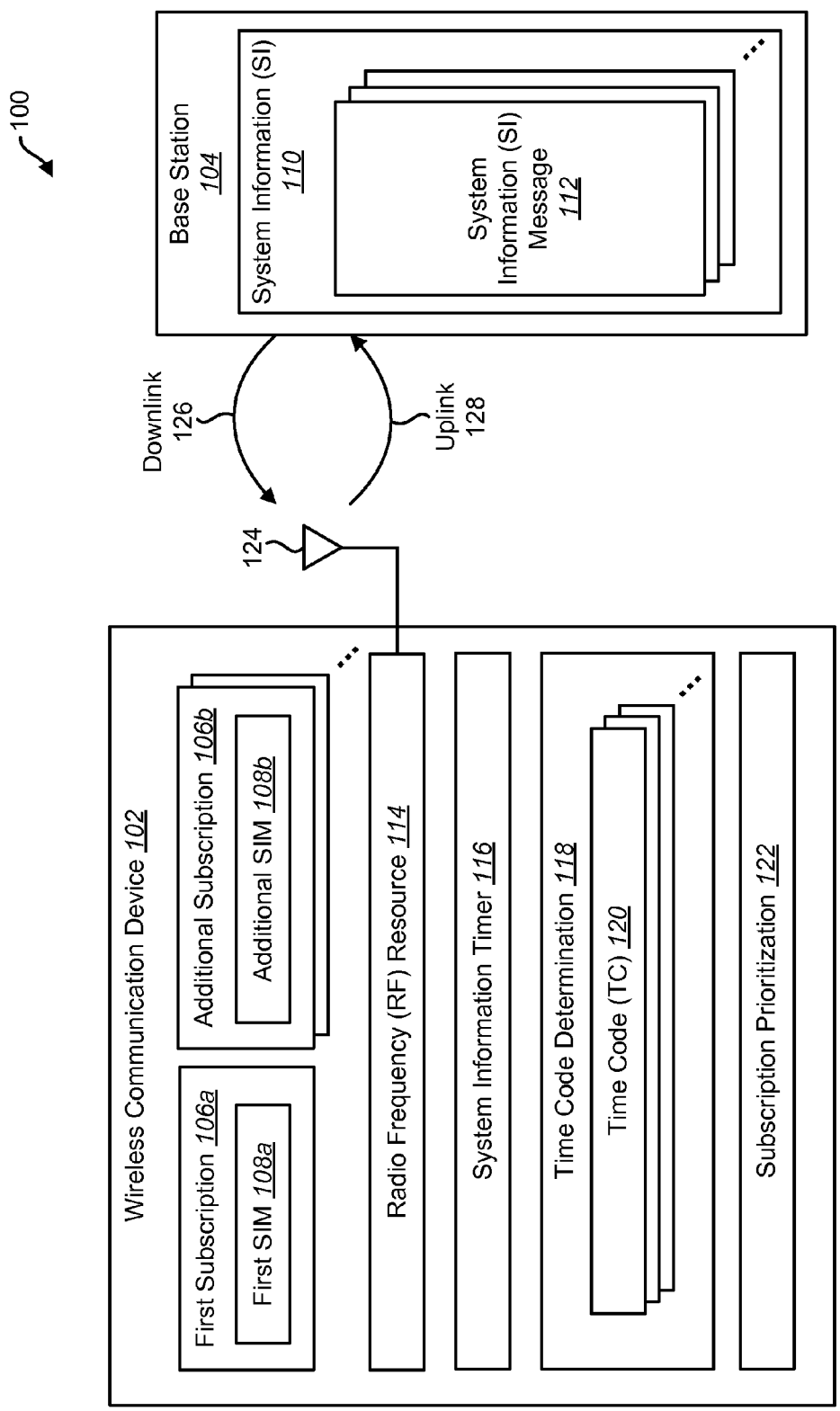
FIG. 1 is a block diagram illustrating a wireless communication system for enhanced system information (SI) decoding according to embodiments of the present invention.

FIG. 1 is a block diagram illustrating a wireless communication system 100 for enhanced system information (SI) decoding according to embodiments of the present invention. Wireless communication systems 100 are widely deployed to provide various types of communication content such as voice, data, and so on. A wireless device may be a wireless communication device 102 or a base station 104. The wireless communication device 102 may be configured for enhanced SI decoding.

A base station 104 is a station that may communicate with one or more wireless communication devices 102. A base station 104 may also be referred to as, and may include some or all of the functionality of an access point, a broadcast transmitter, a NodeB, an evolved NodeB, a base transceiver station, etc. The term "base station" will be used herein. Each base station 104 may provide communication coverage for a particular geographic area. A base station 104 may provide communication coverage for one or more wireless communication devices 102. The term "cell" can refer to a base station 104, the coverage area of the base station 104 and/or communication channels between the base station 104 and wireless communication device 102 depending on the context in which the term is used. A single base station 104 may provide one or more cells.

The wireless communication device 102 may also be referred to as, and may include some or all of the functionality of, a terminal, an access terminal, a subscriber unit, a station, a user equipment (UE), etc. Examples of the wireless communication device 102 may include a cellular phone, a personal digital assistant (PDA), a wireless device, a wireless modem, a handheld device, a laptop computer, a session initiation protocol (SIP) phone, a wireless local loop (WLL) station, entertainment device, appliance, business/household device, visual display, automotive/vehicle component, sensor, actuator, solar array, etc.

A wireless communication device 102, and base station 104 may operate in accordance with certain industry standards, such as Third Generation Partnership Project (3GPP) Long Term Evolution (LTE) standards. Other examples of standards that a communication device may comply with include Institute of Electrical and Electronics Engineers (IEEE) 802.11a, 802.11b, 802.11g, 802.11n and/or 802.11ac (e.g., Wireless Fidelity or "Wi-Fi") standards, IEEE 802.16 (e.g., Worldwide Interoperability for Microwave Access or "WiMAX") standards, Code Division Multiple Access (CDMA) 2000 1x (referred to herein as "1x", may also be referred to as IS-2000 or 1xRTT) standards, Evolution-Data Optimized (EVDO) standards, Interim Standard 95 (IS-95), High Rate Packet Data (HRPD), evolved High Rate Packet Data (eHRPD) radio standards and others. While some of the systems and methods disclosed herein may be described in terms of one or more standards, this should not limit the scope of the disclosure, as the systems and methods may be applicable to many systems and/or standards.

The terms "networks" and "systems" are often used interchangeably. A CDMA network may implement a radio access technology (RAT) such as Universal Terrestrial Radio Access (UTRA), CDMA2000, etc. UTRA includes W-CDMA and Low Chip Rate (LCR) while CDMA2000 covers IS-2000, IS-95 and IS-856 standards. A TDMA network may implement a radio access technology (RAT) such as Global System for Mobile Communications (GSM). An orthogonal frequency division multiple access (OFDMA) network may implement a radio access technology (RAT) such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). Additionally, CDMA2000 is described in documents from an organization named "3rd Generation Partnership Project 2" (3GPP2).

As used herein, the term "system" may refer to a communication system, a telecommunication system, a mobile telecommunication system, a network, a communication network, etc. Additionally, as used herein, the term "system" may refer to a radio access technology (RAT) that may be implemented within a particular system 100.

A wireless communication device 102 may communicate with one or more base stations 104 on a downlink 126 and/or an uplink 128 at any given moment. The downlink 126 (or forward link) refers to the communication link from a base station 104 to a wireless communication device 102, and the uplink 128 (or reverse link) refers to the communication link from a wireless communication device 102 to a base station 104.

A wireless communication device 102 may be capable of communicating with the one or more base stations 104 as part of one or more communication systems 100. A system 100 may utilize one or more radio access technologies (RATs). Examples of radio access technologies (RATs) include CDMA2000 1x (also known as 1x), Global System for Mobile Communications (GSM), High Data Rate (HDR), High Rate Packet Data (HRPD), evolved High Rate Packet Data (eHRPD), Wideband Code Division Multiple Access (W-CDMA), Time Division Synchronous Code Division Multiple Access (TD-SCDMA) and Long Term Evolution (LTE). One or more of the systems 100 may utilize different types of radio access technologies (RATs). For example, a first system 100 may utilize a radio access technology (RAT) that may include a CDMA2000 1x network. In this example, a second system 100 may utilize a radio access technology (RAT) that may include a Long Term Evolution (LTE) network.

Communications between the wireless communication device 102 and base station 104 may be achieved through transmissions over a wireless link. Such a communication link may be established via a single-input and single-output (SISO), multiple-input and single-output (MISO) or a multiple-input and multiple-output (MIMO) system. A multiple-input and multiple-output system includes transmitter(s) and receiver(s) equipped, respectively, with multiple ($N_T$) transmit antennas and multiple ($N_R$) receive antennas for data transmission. Single-input and single-output and multiple-input and single-output systems are particular instances of a multiple-input and multiple-output system. The multiple-input and multiple-output system can provide improved performance (e.g., higher throughput, greater capacity or improved reliability) if the additional dimensionalities created by the multiple transmit and receive antennas are utilized.

The wireless communication device 102 may be configured with multi-mode capabilities and may include multiple transceivers for communicating with different wireless networks over different wireless links/radio access technologies (RATs). For example, the wireless communication device 102 may be configured to communicate over multiple wireless data networks on different subscriptions 106, such as in a multi-subscriber identity module (SIM) wireless device. For example, the wireless communication device 102 may be configured with dual-SIM dual-standby (DSDS) capability, which enables a dual-SIM device to simultaneously participate in two independent communications sessions, generally though a shared transmit/receive chain. In another configuration of a multi-SIM device, a triple-SIM triple-standby (TSTS) device (e.g., a device with three SIMs 108) may simultaneously participate in three independent communications sessions, generally though a shared transmit/receive chain.

Multi-SIM mobile devices have become increasing popular because of their flexibility in service options and other features. DSDS and TSTS devices typically have shared transmit/receive chains associated with each SIM 108. As such, previous communication system designs are inadequate to prevent collisions in the activities of the subscriptions 106 operating within the same device at the same time, such as in DSDS mobile devices.

DSDS devices include two SIMs 108 that enable a user to connect to two different mobile networks (or different accounts on the same network) while using the same DSDS device. TSTS devices include three SIMs 108 that enable a user to connect to three different mobile networks (or different accounts on the same network) while using the same TSTS device. Each SIM 108 serves to identify and authenticate a subscriber using a particular multi-SIM device, and each SIM 108 is associated with only one subscription 106. For example, a SIM 108 may be associated with a subscription 106 to one of GSM, TD-SCDMA, CDMA2000, and WCDMA.

As used herein, a multi-SIM device may include any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which include a programmable processor and memory and circuitry for connecting to at least two mobile communication networks. The various aspects may be useful in mobile communication devices, such as smart phones, and so such devices are referred to in the descriptions of the various embodiments. However, the embodiments may be useful in any electronic devices that may individually maintain a plurality of subscriptions 106 to a plurality of mobile networks.

While the techniques and embodiments described herein relate to a wireless communication device 102 configured with at least one GSM subscription 106, they may be extended to subscriptions 106 on other radio access networks (e.g., UMTS, WCDMA, LTE, etc.). For example, while the wireless communication device 102 described herein may be in a G+G operative mode in which a first subscription 106a and an additional subscription 106b are GSM subscriptions, the wireless communication device 102 may have other operative mode configurations. For example, the wireless communication device 102 may be in a GSM+UMTS mode (e.g., G+U), a GSM+WCDMA mode (e.g., G+W), a GSM+LTE mode (e.g., G+L), etc.

As used herein, the terms "SIM", "SIM card" and "subscriber identification module" are used interchangeably to mean an integrated circuit, embedded into a removable card, that stores an International Mobile Subscriber Identity (IMSI), related key, and/or other information used to identify and/or authenticate the wireless communication device 102 on a network. The term SIM may also be used as shorthand reference to a communication network associated with a particular SIM 108, since the information stored in a SIM 108 enables the wireless communication device 102 to establish a communication link with a particular network. Thus, the SIM 108 and the communication network correlate to one another.

As used herein, the terms "multi-SIM device," "multi-SIM wireless device," "dual-SIM device," "dual-SIM dual standby device," "DSDS device," "triple-SIM device", "triple-SIM triple standby device" and "TSTS device" are used interchangeably to describe a wireless communication device 102 that is configured with more than one SIM 108 and is capable of independently handling communications with networks of multiple subscriptions 106.

A SIM 108 in the various embodiments described herein may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM 108 may be a UICC removable user identity module (R-UIM) or a CDMA subscriber identity module (CSIM) on a card.

Each SIM 108 may have a CPU, ROM, RAM, EEPROM and I/O circuits. A SIM 108 used in the various embodiments may contain user account information, an international mobile subscriber identity (IMSI), a set of SIM application toolkit (SAT) commands and storage space for phone book contacts. A SIM 108 may further store a Home Public-Land-Mobile-Network (HPLMN) code to indicate the SIM 108 network operator provider. An Integrated Circuit Card Identity (ICCID) SIM serial number is printed on the SIM 108 for identification.

The wireless communication device 102 may include a first SIM 108a that is associated with a first subscription 106a. The wireless communication device 102 may also include at least one additional SIM 108b that is associated with an additional subscription 106b. While multiple additional subscriptions 106b are illustrated in FIG. 1, it should be appreciated that the wireless communication device 102 may include one or more additional subscriptions 106b. In the case of a DSDS device, the wireless communication device 102 may have one additional subscription 106b. In the case of a TSTS device, the wireless communication device 102 may have two additional subscriptions 106b, etc.

Each subscription 106 in the wireless communication device 102 (e.g., the first subscription 106a and the one or more additional subscriptions 106b) may share a baseband-RF resource chain. In one configuration, the baseband-RF resource chain may include a baseband modem processor to perform baseband/modem functions for communications on a subscription 106, and one or more amplifiers and radios, referred to generally herein as an RF resource 114.

The RF resource 114 may be a transceiver that performs transmit/receive functions for the first subscription 106a and additional subscription(s) 106b of the wireless communication device 102. RF resource 114 may include separate transmit and receive circuitry, or may include a transceiver that combines transmitter and receiver functions. The RF resource 114 may be coupled to one or more wireless antennas 124.

In a particular embodiment, the baseband processor(s), and RF resource 114 may be included in a system-on-chip device. The first SIM 108a and additional SIM(s) 108b may be external to the system-on-chip device. Further, various input and output devices may be coupled to components of the system-on-chip device, such as interfaces or controllers. Examples of user input components suitable for use in the wireless communication device 102 may include, but are not limited to, a keypad and a touchscreen display.

In one embodiment, a receiver and a transmitter may be included in the RF resource 114. In a particular embodiment, the transmitter may include a data processor that may format, encode and interleave data for a transmission. The transmitter may include a modulator that modulates a carrier signal with encoded data, for example, by performing Gaussian minimum shift keying (GMSK). One or more transmit circuits may condition the modulated signal (e.g., by filtering, amplifying and upconverting) to generate a RF modulated signal for transmission. The RF modulated signal may be transmitted, for example, to a base station 104 via the antenna 124.

At the receiver, the antenna 124 may receive RF modulated signals from a base station 104, for example. One or more receive circuits may condition (e.g., filter, amplify and downconvert) the received RF modulated signal, digitize the conditioned signal and provide samples to a demodulator. The demodulator may extract the original information-bearing signal from the modulated carrier wave, and may provide the demodulated signal to a data processor. The data processor may de-interleave and decode the signal to obtain the original, decoded data, and may provide decoded data to other components in the wireless device. Operations of the transmitter and the receiver may be controlled by a processor (e.g., a baseband processor(s)). In the various embodiments, each of the transmitter and receiver may be implemented as circuitry that is separated from their corresponding receive and transmit circuitries (not shown). Alternatively, the transmitter and the receiver may be respectively combined with corresponding receive circuitry and transmit circuitry.

The first subscription 106a may be a GSM subscription. In order to camp on a cell, the wireless communication device 102 may acquire system information (SI) 110 from a base station 104 associated with the cell. The system information (SI) 110 may be sent to the wireless communication device 102 as SI messages 112. In GSM acquisition, the wireless communication device 102 may first attempt to synchronize to the strongest carrier by reading the frequency correction channel (FCCH) and then the synchronization channel (SCH) sent by the base station 104.

The wireless communication device 102 may then read mandatory SI messages 112 to determine if the cell is suitable to camp on. The system information type 3 (SI3) message or system information type 4 (SI4) message may be mandatory SI messages 112. After receiving at least one of an SI3 or SI4 message, the wireless communication device 102 may know the paging group, channel configuration and whether a cell is suitable or not. The wireless communication device 102 may then accordingly camp on to that cell and read other SI messages 112 to acquire a full set of SI messages 112. Upon acquiring the SI messages 112, the wireless communication device 102 may then camp on the cell.

The entire acquisition of the SI messages 112 may be monitored by a system information timer 116. The system information timer 116 may supervise the reception of the SI messages 112. The system information timer 116 may also be referred to as a sysinfo timer.

If the system information timer 116 expires before the SI gathering completes, an acquisition failure is declared for that cell and the wireless communication device 102 restarts a search for service. In one embodiment, the system information timer 116 may be approximately 8 seconds. If the system information timer 116 expires without the wireless communication device 102 acquiring a complete set of SI messages 112, the wireless communication device 102 may initiate a full power scan for other cells. Therefore, the wireless communication device 102 does not camp on this particular cell, even if the cell is good (e.g., power levels and signal to noise ratio (SNR) of the cell are good).

Each SI message 112 may be associated with at least one time code (TC) 120. The SI messages 112 may be sent from the base station 104 in a broadcast control channel (BCCH) as part of a multiframe, as described in connection with FIG. 4. Different SI messages 112 may be sent in different BCCHs. In other words, one or more SI messages 112 may be sent in one multiframe, while other SI messages 112 may be sent in another multiframe. The SI messages 112 may be repeated in a cyclic pattern. For example, the SI messages 112 may be repeated every four or eight multiframes.

A TC 120 is a parameter that indicates in which multiframe an SI message 112 may be transmitted. In one embodiment, the TC 120 may have a value from 0 to 7 corresponding to an 8-multiframe cycle, as described in connection with FIG. 5. If an SI message 112 has a TC 120 value of 0 (TC=0), then the transmission of that SI message 112 is repeated in each multiframe that corresponds to TC=0. The TC 120 for each SI message 112 may be pre-configured or specified. For example, 3GPP TS 45.002 defines a mapping of SI messages 112 to TC 120 values. Table 1 illustrates one configuration of a SI message/TC mapping according to 3GPP TS 45.002.

TABLE 1

| System Information Message | Sent when TC= | Allocation |
| --- | --- | --- |
| Type 1 | 0 | BCCH Norm |
| Type 2 | 1 | BCCH Norm |
| Type 2 bis | 5 | BCCH Norm |
| Type 2 ter | 5 or 4 | BCCH Norm |
| Type 2 quarter | (5 or 4) or 5 | BCCH Norm / BCCH Ext |
| Type 2n | 4 / 4 | BCCH Norm / BCCH Ext |
| Type 3 | 2 and 6 | BCCH Norm |
| Type 4 | 3 and 7 | BCCH Norm |
| Type 7 | 7 | BCCH Ext |
| Type 8 | 3 | BCCH Ext |
| Type 9 | 4 | BCCH Norm |
| Type 13 | 4 or 0 | BCCH Norm / BCCH Ext |
| Type 13 alt | 4 or 0 | BCCH Norm / BCCH Ext |
| Type 15 | 4 or 1 | BCCH Norm / BCCH Ext |
| Type 16 | 6 | BCCH Ext |
| Type 17 | 2 | BCCH Ext |
| Type 18 | Not Fixed | Not Fixed |
| Type 19 | Not Fixed | Not Fixed |
| Type 20 | Not Fixed | Not Fixed |

System information messages 112 may be transmitted in defined multiframes and defined blocks within one multiframe, as follows (where TC=(FN DIV 51) mod (8)). Also, for some system information messages 112, the position where the system information messages 112 are transmitted is contained in other system information messages 112. The network may send any system information message 112 when sending of a specific system information message 112 is not required.

The BCCH Ext may share the resource with a paging channel (PCH) and access grant channel (AGCH). System Information Type 1 (SI1) may be sent if frequency hopping is in use or when the notification channel (NCH) is present in a cell. If the wireless communication device 102 finds another message on BCCH Norm when TC=0, the wireless communication device 102 can assume that System Information Type 1 is not in use.

System information type 2 bis or 2 ter messages may be sent if needed, as determined by the system operator. If only one of them is needed, it may be sent when TC=5. If both are needed, 2bis may be sent when TC=5 and 2ter may be sent at least once within any of 4 consecutive occurrences of TC=4. An SI 2 message may be sent at least every time TC=1. System information type 2 quarter may be sent if needed, as determined by the system operator. If sent on BCCH Norm, system information type 2 quarter may be sent when TC=5 if neither of 2bis and 2ter are used, otherwise system information type 2 quarter may be sent at least once within any of 4 consecutive occurrences of TC=4. If sent on BCCH Ext, system information type 2 quarter is sent at least once within any of 4 consecutive occurrences of TC=5.

Use of system information type 7 and 8 is not always necessary. It is necessary if system information type 4 does not contain all information needed for cell selection and reselection. System information type 9 may be sent in those blocks with TC=4 which are specified in system information type 3.

System information type 13 is related to the GPRS service. System information type 13 may be sent if GPRS support is indicated in one or more of system information type 3, 4, 7 or 8 messages. These system information messages 112 also indicate if the system information type 13 message is sent on the BCCH Norm or if the message is transmitted on the BCCH Ext. In the case that the message is sent on the BCCH Norm, it is sent at least once within any of 4 consecutive occurrences of TC=4.

System information type 16 and 17 may be related to a support of Localized Service Area (SoLSA) service. System information type 18 and 20 may be sent in order to transmit non-GSM broadcast information. The frequency with which system information type 18 and 20 are sent may be determined by the system operator. System Information type 9 identifies the scheduling of system information type 18 and 20 messages.

System information type 19 may be sent if COMPACT neighbors exist. If system information type 19 is present, then its scheduling may be indicated in system information type 9.

System information type 15 may be broadcast if dynamic ARFCN mapping is used in the PLMN. If sent on BCCH Norm, system information type 15 is sent at least once within any of 4 consecutive occurrences of TC=4. If sent on BCCH Ext, system information type 15 is sent at least once within any of 4 consecutive occurrences of TC=1.

System information type 13 alt is only related to the GERAN Iu mode. System information type 13 alt may be sent if GERAN Iu mode support is indicated in one or more of System Information Type 3, 4, 7 or 8 messages and SI 13 is not broadcast. These system information messages 112 may also indicate if the system information type 13 alt message is sent on the BCCH Norm or if the message is transmitted on the BCCH Ext. In the case that the system information type 13 alt message is sent on the BCCH Norm, it is sent at least once within any of 4 consecutive occurrences of TC=4.

System information type 2n is optionally sent on BCCH or BCCH Ext if needed, as determined by the system operator. In the case that the message is sent on the BCCH Norm, it is sent at least once within any of 4 consecutive occurrences of TC=4. If the system information type 2n message is sent on BCCH Ext, it is sent at least once within any of 2 consecutive occurrences of TC=4.

In one example, according to Table 1, system information type 1 (SI1) is sent when the TC 120 value is 0 (TC=0). It should be noted that System Information messages 112 like type 3, 4, 7 or 8 indicate if the message is sent on the BCCH Norm or if the message is transmitted on the BCCH Ext. Using the TC 120 values, the wireless communication device 102 may know when an SI message 112 is scheduled to be transmitted from a base station 104.

In some cases, network operators may schedule different SI messages 112 on the same TC 120. For example, as illustrated in Table 1, system information type 2 ter (SI2ter) and system information type 13 (SI13) may both be scheduled on TC=4. In this case, the specifications provide that when multiple SI messages 112 are sent on the same TC 120, each of the multiple SI messages 112 may be broadcasted at least once within any 4 consecutive occurrences of that TC 120.

To acquire each of the multiple SI messages 112 sent on the same TC 120, the wireless communication device 102 may perform 4 consecutive decodes of the same TC 120. In one embodiment, one radio block (e.g., corresponding to an 8-multiframe cycle) is approximately 1.88 seconds. Therefore, to perform 4 consecutive decodes of the same TC 120 would take at least 7.52 seconds.

In a multi-SIM device, two or more subscriptions 106 may attempt to perform activities simultaneously. In a multi-SIM device in which the subscriptions 106 share an RF resource 114 (e.g., DSDS or TSTS), these overlapping activities result in collision. To allocate the RF resource 114 between the subscriptions 106, the wireless communication device 102 may perform RF arbitration. Higher priority activities on one subscription 106 may take priority over lower priority activities on another subscription 106.

In one embodiment, a high priority activity may include registration or signaling activities. For example, a high priority activity may be performing a location area update (LAU) or a roaming area update (RAU). System information 110 reading or BCCH decoding may be a lower priority activity than the registration activities. Therefore, a subscription 106 performing a high priority activity may override (e.g., preempt) the other subscription 106 that is performing a lower priority activity. In other words, the lower priority activity may be delayed until the completion of the higher priority activity.

In one example, the first subscription 106a and the additional subscription 106b may be trying to acquire cells. The additional subscription 106b may be performing a registration (e.g., LAU or RAU). The first subscription 106a may need to acquire SI2ter and SI13 when TC=4. Therefore, the first subscription 106a needs to perform four consecutive decodes of the same TC 120. Because the additional subscription 106b is performing a higher priority activity than the first subscription 106a, the system information 110 decoding of the first subscription 106a gets preempted.

Once the additional subscription 106b finishes the higher priority activity, the first subscription 106a may use the RF resource 114 to perform the system information 110 decoding. However, the system information timer 116 may expire before the wireless communication device 102 can perform four consecutive decodes of the same TC 120.

In one embodiment, the signaling activities of the additional subscription 106b may take approximately 3 seconds. As described above, four consecutive decodes of the same TC 120 may take approximately 7.52 seconds. If the system information timer 116 is 8 seconds, then the wireless communication device 102 will not finish the four consecutive decodes of the same TC 120 after performing the registration activity of additional subscription 106b. Upon expiration of the system information timer 116, the wireless communication device 102 may declare an acquisition failure for the first subscription 106a. The wireless communication device 102 may perform a full power scan and attempt to camp on another cell despite a good cell being available. In other words, the first subscription 106a in acquisition is not able to decode four successive TCs 120 due to RF denial and, thus, is not able to capture all the mandatory SI messages 112, resulting in a full service scan.

The wireless communication device 102 may perform enhanced system information decoding to avoid delayed camping and full service search due to SI failure when different SI messages 112 are sent on same TC 120. In one embodiment, the wireless communication device 102 may include a time code determination module 118 and a subscription prioritization module 122.

The time code determination module 118 may determine the TCs 120 associated with SI messages 112 for the first subscription 106a. This may be accomplished by mapping the SI messages 112 to the TCs 120, as described above. In one configuration, the scheduling of SI messages 112 and the TCs 120 associated with the SI messages 112 may be deduced from a system information type 3 (SI3) message (if BCCH_EXT is used) and SI mapping (as illustrated in Table 1).

The time code determination module 118 may determine whether multiple SI messages 112 for the first subscription 106a are being sent on the same TC 120. The time code determination module 118 may determine that two or more SI messages 112 are scheduled to be sent in the same TC 120. For example, the time code determination module 118 may determine that SI2ter and SI13 are both be scheduled on TC=4. If there are SI messages 112 that are being sent on the same TC 120, then four consecutive decodes of that TC 120 should be performed.

The subscription prioritization module 122 may determine whether decoding the SI messages 112 for the first subscription 106a can be prioritized over the activity of the additional subscription 106b. The subscription prioritization module 122 may check to see what the additional subscription 106b is doing. The subscription prioritization module 122 may determine whether the activity of the additional subscription 106b can be preempted.

The subscription prioritization module 122 may determine whether the additional subscription 106b is performing a lower priority activity than decoding SI messages 112 by the first subscription 106a. For example, the additional subscription may be performing (or may be scheduled to perform) a synchronization channel (SCH) read, a broadcast control channel (BCCH) read, a paging channel (PCH) read or neighbor cell acquisition. The first subscription 106a may preempt these lower priority activities. Therefore, the subscription prioritization module 122 may prioritize performing four consecutive decodes of the same TC 120 by the first subscription 106a before performing the activity of the additional subscription 106b.

If the subscription prioritization module 122 determines that the additional subscription 106b is performing a higher priority activity than decoding SI messages 112, the higher priority activity may not be preempted. A higher priority activity may include a signaling or registration activity (e.g., LAU or RAU). In this case, the subscription prioritization module 122 may increase the system information timer 116 to accommodate four consecutive decodes of the same TC 120 by the first subscription 106a after completion of the higher priority activity by the additional subscription 106b. In other words, the subscription prioritization module 122 may relax the system information timer 116 to provide for the four consecutive decodes of the same TC 120 after completion of the higher priority activity of the additional subscription 106b. In one embodiment, the system information timer 116 may be increased to 12 seconds to accommodate the signaling activity and the four consecutive TC 120 decodes.

After the additional subscription 106b finishes the higher priority activity, the additional subscription 106b may release the RF resource 114. The subscription prioritization module 122 may then prioritize the four consecutive decodes of the same TC 120 by the first subscription 106a over other lower priority activities of the additional subscription 106b.

By prioritizing decoding the SI messages 112 for the first subscription 106a when activity of the additional subscription 106b can be preempted or increasing the system information timer 116 when the activity of the additional subscription 106b cannot be preempted, the wireless communication device 102 may avoid an unnecessary acquisition failure. This may result in faster cell acquisition and improved power efficiency. For example, the wireless communication device 102 may avoid performing power scans, thus saving power.

Figure 2:
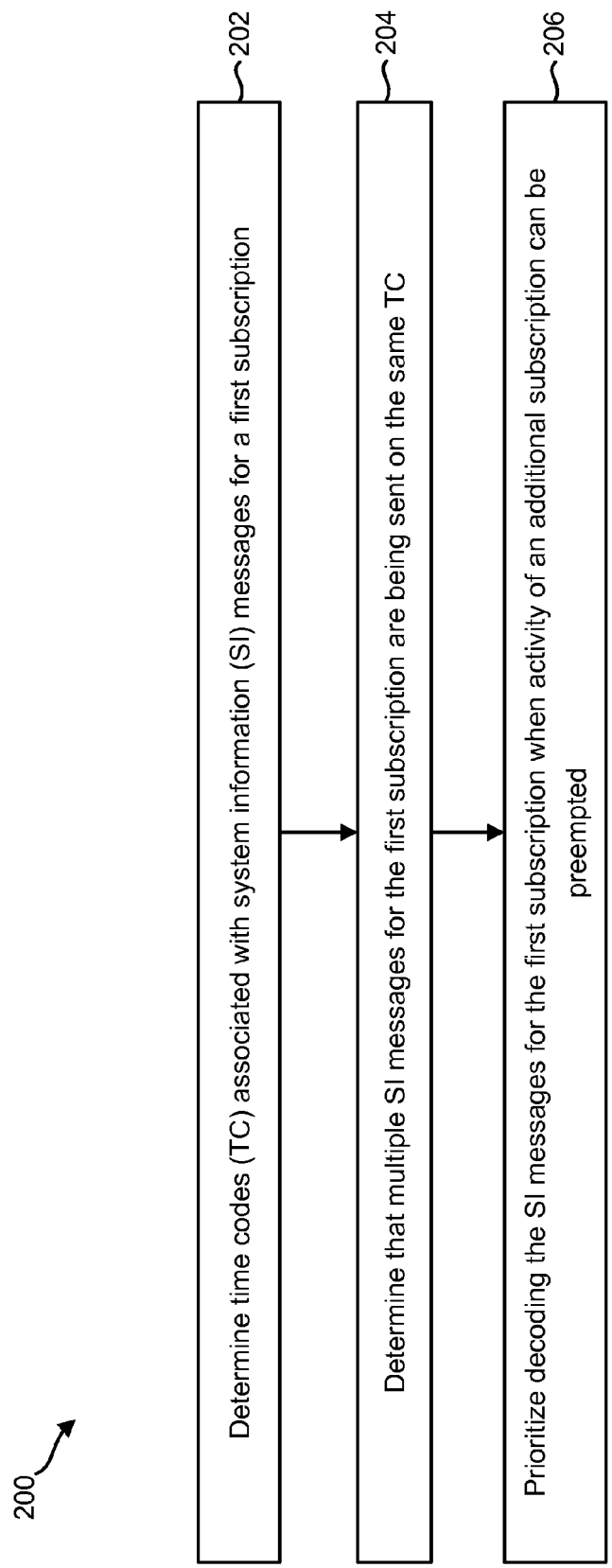
FIG. 2 is a flow diagram of a method for enhanced SI decoding according to some embodiments.

FIG. 2 is a flow diagram of a method 200 for enhanced system information (SI) 110 decoding according to some embodiments. The method 200 may be performed by a wireless communication device 102. The wireless communication device 102 may include a first subscription 106a and at least one additional subscription 106b. The first subscription 106a may be in an acquisition state to acquire system information 110 to camp on a cell. In one embodiment, the first subscription 106a may be a GSM subscription. The additional subscription 106b may be a GSM subscription or may be a subscription on another radio access network (e.g., UMTS, WCDMA, LTE, etc.).

The wireless communication device 102 may determine 202 time codes (TCs) 120 associated with SI messages 112 for the first subscription 106a. This may be accomplished by mapping the SI messages 112 to the TCs 120, as described above in connection with FIG. 1. In one configuration, the scheduling of SI messages 112 and the TCs 120 associated with the SI messages 112 may be deduced from a system information type 3 (SI3) message (if BCCH_EXT is used) and SI mapping (as illustrated in Table 1).

The wireless communication device 102 may determine 204 that multiple SI messages 112 for the first subscription 106a are being sent on the same TC 120. For example, the wireless communication device 102 may determine that SI2ter and SI13 are both be scheduled on TC=4. If there are SI messages 112 that are being sent on the same TC 120, then a base station 104 may send each of the SI messages 112 in a BCCH transmission on the TC 120 at least once within any of four consecutive occurrences of the TC 120. Therefore, to acquire the multiple SI messages 112 that are sent on the same TC 120, the wireless communication device 102 may perform four consecutive decodes of that TC 120.

The wireless communication device 102 may prioritize 206 decoding the SI messages 112 for the first subscription 106a when activity of the additional subscription 106b can be preempted. For example, the wireless communication device 102 may check to see what the additional subscription 106b is doing. The wireless communication device 102 may determine whether the activity of the additional subscription 106b can be preempted.

The wireless communication device 102 may determine whether the additional subscription 106b is performing a lower priority activity than decoding SI messages 112 by the first subscription 106a. The lower priority activities may include performing a synchronization channel (SCH) read, a broadcast control channel (BCCH) read, a paging channel (PCH) read or neighbor cell acquisition. The first subscription 106a may preempt these lower priority activities by the additional subscription 106b. Therefore, the wireless communication device 102 may prioritize performing four consecutive decodes of the same TC 120 by the first subscription 106a before performing the activity of the additional subscription 106b.

If the wireless communication device 102 determines that the additional subscription 106b is performing a higher priority activity than decoding SI messages 112, the higher priority activity may not be preempted. A higher priority activity may include a signaling or registration activity (e.g., LAU or RAU). In this case, the wireless communication device 102 may increase a system information timer 116 to accommodate four consecutive decodes of the same TC 120 by the first subscription 106a after completion of the higher priority activity by the additional subscription 106b.

After the additional subscription 106b finishes the higher priority activity, the additional subscription 106b may release the RF resource 114. The wireless communication device 102 may then prioritize the four consecutive decodes of the same TC 120 by the first subscription 106a over other lower priority activities of the additional subscription 106b.

Figure 3:
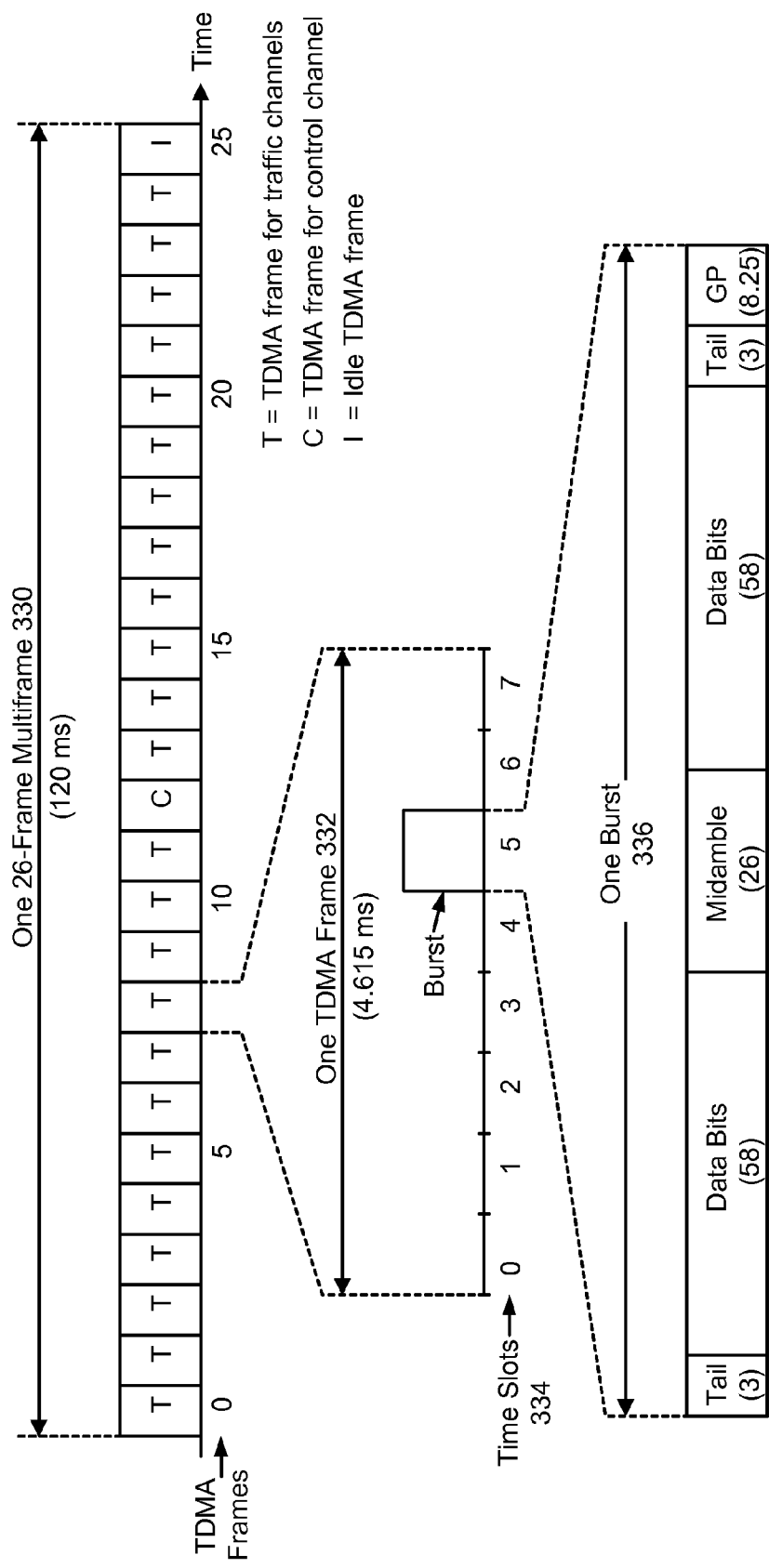
FIG. 3 shows example multiframe, frame and burst formats in Global System for Mobile Communications (GSM)

FIG. 3 shows example multiframe 330, frame 332 and burst 336 formats in GSM. The timeline for transmission in GSM is divided into multiframes 330. For traffic channels used to transmit user-specific data, each multiframe 330 in this example includes 26 TDMA frames 332, which are labeled as TDMA frames 0 through 25. In another configuration, a multiframe 330 may include 51 TDMA frames.

The traffic channels, in this example, are sent in TDMA frames 0 through 11 and TDMA frames 13 through 24 of each multiframe 330 (other mappings are possible using half-rate channels or Voice services over Adaptive Multi-user channels on One Slot (VAMOS)). A control channel is sent in TDMA frame 12. No data is sent in idle TDMA frame 25, which is used by the wireless communication devices 102 to make measurements of signals transmitted by neighbor base stations 104.

Each timeslot 334 within a frame 332 is also referred to as a "burst" 336 in GSM. Each burst 336, in this example, includes two tail fields, two data fields, a training sequence (or midamble) field and a guard period (GP). The number of symbols in each field is shown inside the parentheses. A burst 336 includes symbols for the tail, data, and midamble fields. No symbols are sent in the guard period. TDMA frames of a particular carrier frequency are numbered and formed in groups of 26 or 51 TDMA frames 332 called multiframes 330.

Figure 4:
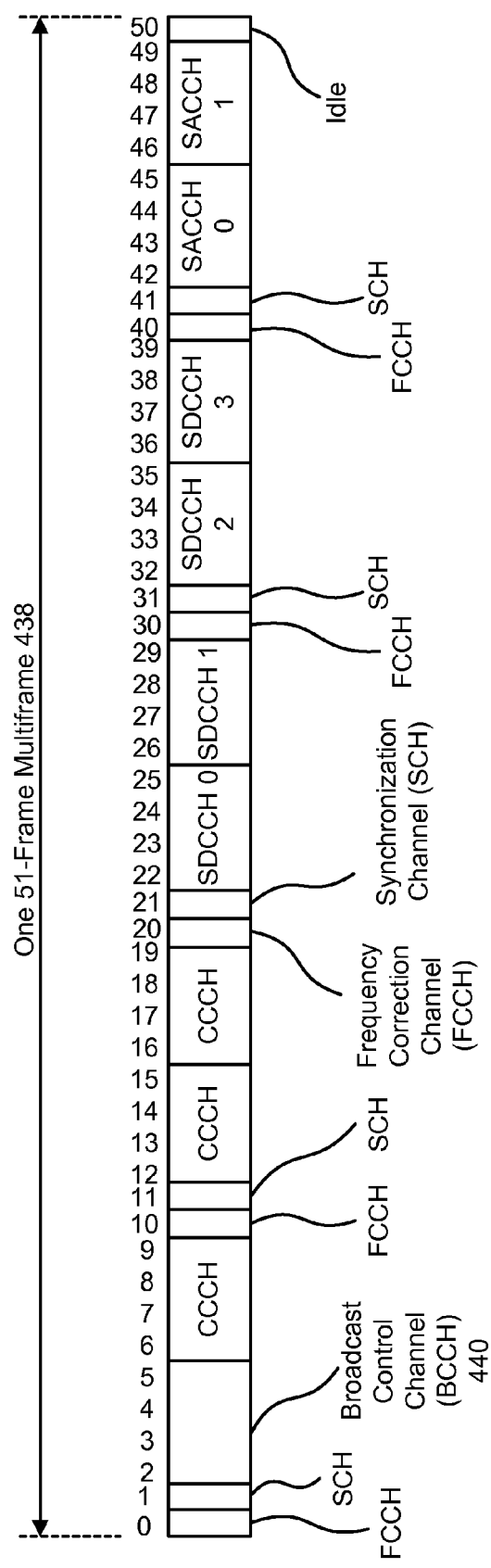
FIG. 4 is a block diagram illustrating a 51-frame multiframe for use in the present systems and methods.

FIG. 4 is a block diagram illustrating a 51-frame multiframe 438 for use in the present systems and methods. The 51-frame multiframe 438 may be from a scanned cell (e.g., a scanned ARFCN). Different channels may be mapped to different frames within the 51-frame multiframe 438. For example, a frequency correction channel (FCCH) may be mapped to the first frame (frame 0). A synchronization channel (SCH) may immediately follow the FCCH. The broadcast control channel (BCCH) 440 may be mapped to frames 2 through 5. The mapping of the channels to specific frames may be fixed by the specification.

The FCCH may be repeated every 10 frames (approximately every 50 ms). In one configuration, the FCCH may include an all-zero sequence that produces a fixed tone. In some implementations, the fixed tone is 67 kHz. This tone enables the wireless communication device 102 to lock its local oscillator to the base station 104 clock tone.

Once the FCCH is found (e.g., acquired), the next frame (4.6 ms later) will be the SCH. The SCH may allow the wireless communication device 102 to synchronize the timing of the wireless communication device 102 with the base station 104.

The 51-frame multiframe 438 may also include other information. This information may include the common control channel (CCCH), the stand-alone dedicated control channel (SDCCH) and the slow associated control channel (SACCH).

Figure 5:
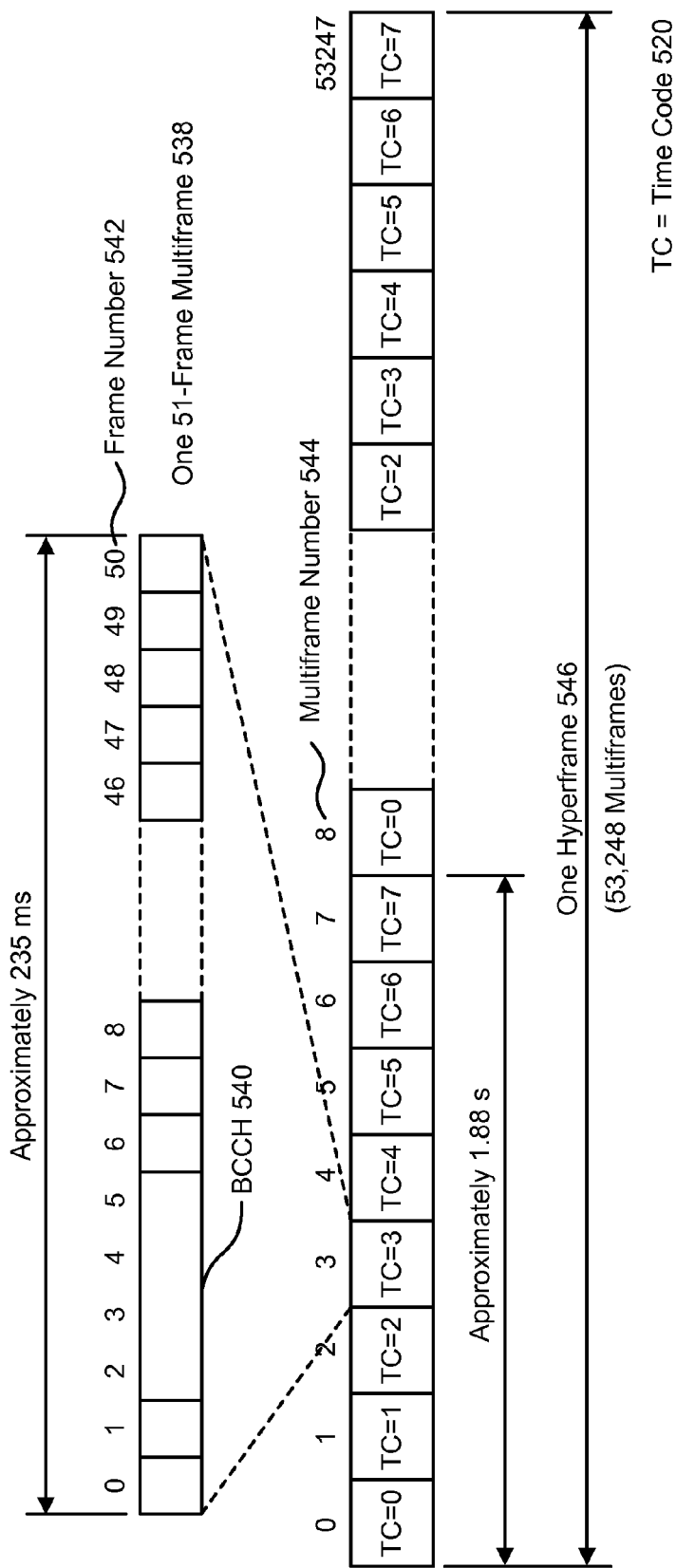
FIG. 5 illustrates an example of broadcast control channel (BCCH) to time code (TC) mapping.

FIG. 5 illustrates an example of broadcast control channel (BCCH) 540 to time code (TC) 520 mapping. Each frame in a multiframe 538 may have a frame number 542. For a 51-frame multiframe 538, the broadcast control channel (BCCH) 540 may be mapped to frames 2 through 5. The transmission of a 51-frame multiframe 538 may take approximately 235 milliseconds (ms). A hyperframe 546 may include 53,248 multiframes 538. Each multiframe 538 in a hyperframe 546 may have a multiframe number 544.

Each multiframe 538 may be associated with a TC 520. A TC indicates a multiframe 538 in which an SI message 112 may be transmitted. In one embodiment, the TCs 520 have an 8-multiframe cycle. This 8-multiframe cycle may take 1.88 seconds to complete. System information (SI) messages 112 may be sent in different BCCHs 540 according to the mapping of Table 2. Table 2 also includes the frequency at which SI messages 112 are sent.

TABLE 2

| System Information Message | Sent on | Frequency |
| --- | --- | --- |
| Type 1 | TC = 0 | Once every 1.88 s (if sent) |
| Type 2 | TC = 1 | Once every 1.88 s |
| Type 2 bis | TC = 5 | Once every 1.88 s (if sent) |
| Type 2 ter, Type 2 quarter | TC = 4 or TC = 5 | Once every 1.88 s (if sent) |
| Type 3 | TC = 2 and TC = 6 | Twice every 1.88 s |
| Type 4 | TC = 3 and TC = 7 | Twice every 1.88 s |
| Type 13 | TC = 4 or TC = 0 | Once every 1.88 s (if sent) |

As one example, system information type 1 (SI1) is sent on TC=0. Therefore, an SI1 message is sent in the BCCH 540 of multiframe 0 (e.g., multiframe number=0). The transmission of the SI1 message is repeated in multiframe 8, and so on.

Figure 6:
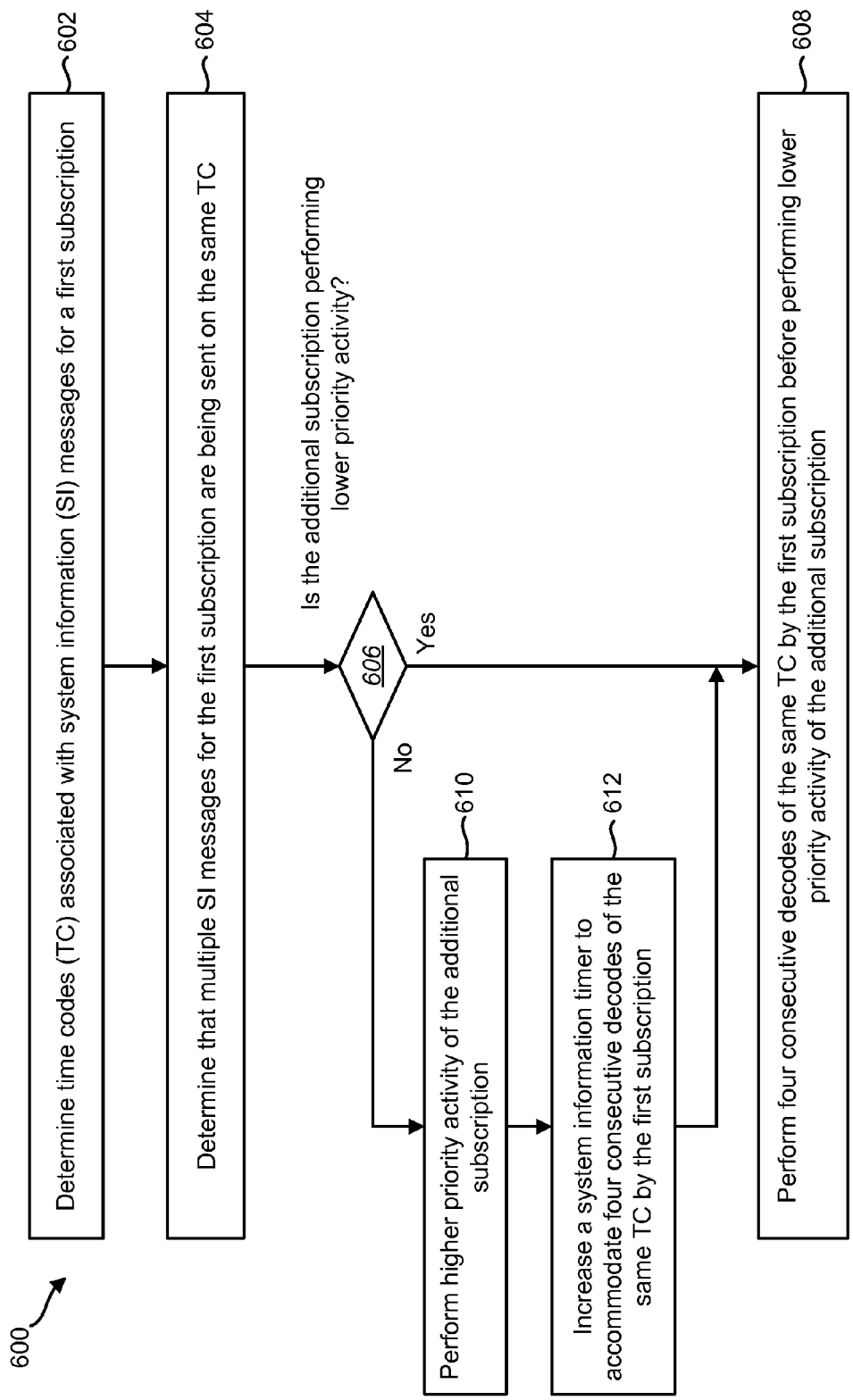
FIG. 6 is a flow diagram of a detailed method for enhanced SI decoding according to some embodiments.

FIG. 6 is a flow diagram of a detailed method 600 for enhanced system information (SI) 110 decoding according to some embodiments. The method 600 may be performed by a wireless communication device 102. The wireless communication device 102 may include a first subscription 106a and at least one additional subscription 106b. The first subscription 106a may be in an acquisition state to acquire the system information 110 to camp on a cell.

The wireless communication device 102 may determine 602 time codes (TCs) 120 associated with SI messages 112 for the first subscription 106a. This may be accomplished as described above in connection with FIG. 1.

The wireless communication device 102 may determine 604 that multiple SI messages 112 for the first subscription 106a are being sent on the same TC 120. For example, the wireless communication device 102 may determine that SI2ter and SI13 are both be scheduled on TC=4. In another example, the wireless communication device 102 may determine that SI2bis and SI2quarter are both be scheduled on TC=5.

The wireless communication device 102 may determine 606 whether an additional subscription 106b is performing a lower priority activity. The lower priority activities may include performing a synchronization channel (SCH) read, a broadcast control channel (BCCH) read, a paging channel (PCH) read or neighbor cell acquisition. If the additional subscription 106b is performing a lower priority activity, the first subscription 106a may preempt these lower priority activities. The wireless communication device 102 may perform 608 four consecutive decodes of the same TC 120 by the first subscription 106a before performing the activity of the additional subscription 106b.

If the wireless communication device 102 determines 606 that the additional subscription 106b is performing a higher priority activity than decoding SI messages 112, the higher priority activity may not be preempted. The wireless communication device 102 may perform 610 the higher priority activity of the additional subscription 106b. A higher priority activity may include a signaling or registration activity (e.g., LAU or RAU).

The wireless communication device 102 may increase 612 a system information timer 116 to accommodate four consecutive decodes of the same TC 120 by the first subscription 106a. After the additional subscription 106b finishes the higher priority activity, the wireless communication device 102 may then perform 608 the four consecutive decodes of the same TC 120 by the first subscription 106a before performing other lower priority activities of the additional subscription 106b.

Figure 7:
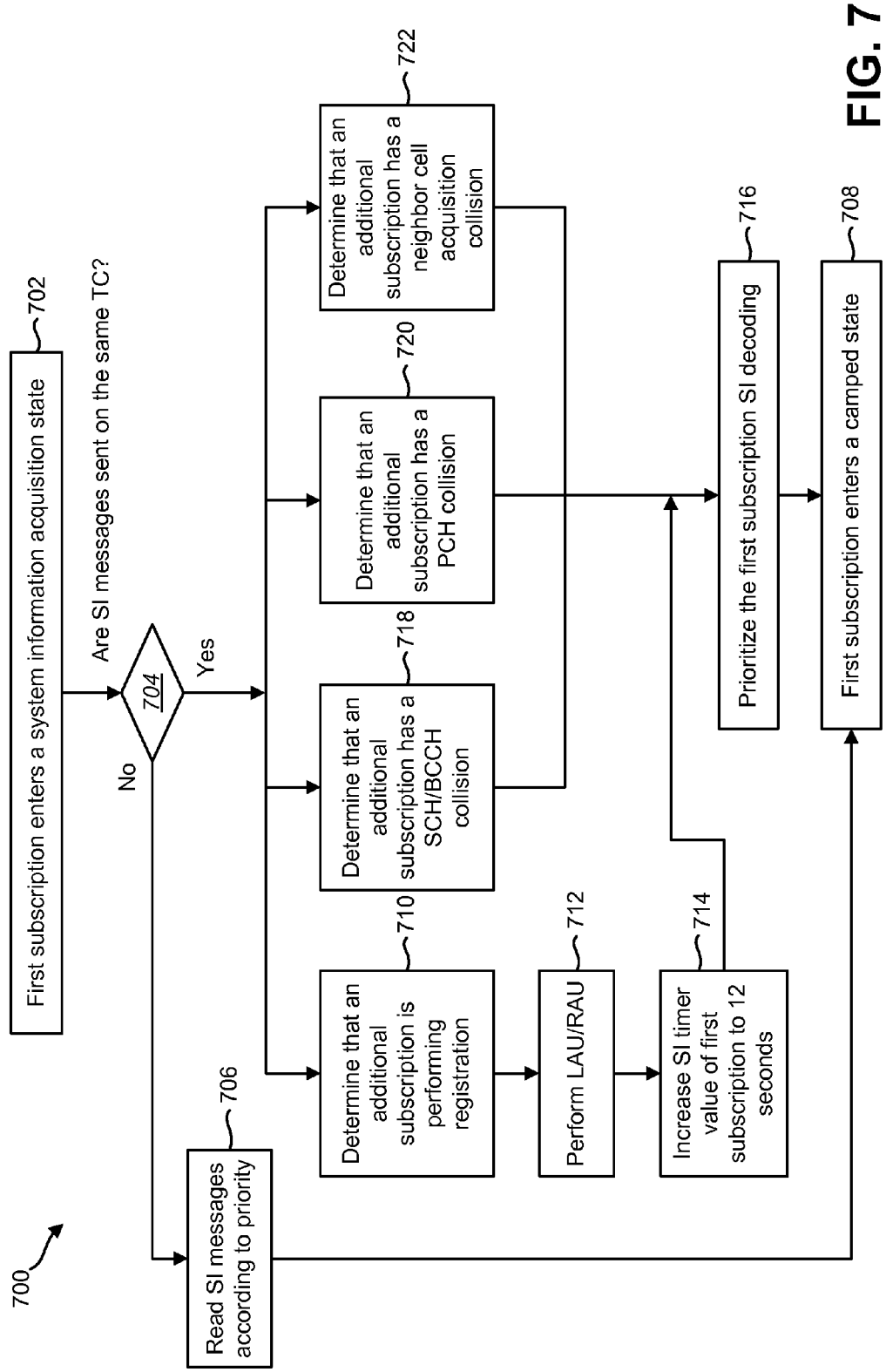
FIG. 7 is a flow diagram of another detailed method for enhanced SI decoding according to some embodiments.

FIG. 7 is a flow diagram of another detailed method 700 for enhanced system information (SI) 110 decoding according to some embodiments. The method 700 may be performed by a wireless communication device 102. The wireless communication device 102 may include a first subscription 106a and at least one additional subscription 106b. The first subscription 106a may enter 702 a system information acquisition state to camp on a cell.

The wireless communication device 102 may determine 704 whether SI messages 112 are sent on the same time codes (TCs) 120 for the first subscription 106a. If SI messages are not sent on the same TCs 120, then the wireless communication device 102 may read 706 the SI messages 112 according to priority. The SI message 112 read priority may depend on what activity an opposite subscription 106 is doing. If an opposite subscription 106 is performing registration (e.g., LAU/RAU) or a voice call, then the SI message 112 reads would be given lower priority. Otherwise, if the opposite subscription 106 activity can be pre-empted, SI message 112 reads would be given higher priority. Upon acquiring a complete set of SI messages 112, the first subscription 106a may enter 708 a camped state (e.g., the wireless communication device 102 may camp on a cell for the first subscription 106a).

If the wireless communication device 102 determines 704 that SI messages 112 are sent on the same TC 120, then the wireless communication device 102 may check what the one or more additional subscriptions 106b are doing to determine whether the activity of the one or more additional subscriptions 106b can be preempted.

If the wireless communication device 102 determines 710 that an additional subscription 106b is performing registration (e.g., LAU/RAU) or a signaling activity, then this is a higher priority activity than the SI decoding of the first subscription 106b. This higher priority activity may not be preempted. Therefore, the wireless communication device 102 performs 712 the location area update (LAU)/roaming area update (RAU).

The wireless communication device 102 increases 714 the system information timer 116 of the first subscription 106a to 12 seconds. The system information timer 116 of the first subscription 106a may be increased to 12 seconds because the registration procedure is approximately 3 seconds and four consecutive decodes of the same TC 120 is approximately 7.52 seconds.

Once the additional subscription 106b finishes performing registration (e.g., LAU/RAU), then the wireless communication device 102 may prioritize 716 the first subscription 106a SI decoding. This may include performing four consecutive decodes of the same TC 120 by the first subscription 106a before performing other lower priority activities of the one or more additional subscriptions 106b. The first subscription 106a may then enter 708 a camped state.

If the wireless communication device 102 determines 704 that SI messages 112 are sent on the same TC 120, the wireless communication device 102 may determine that an additional subscription 106b is performing a lower priority activity. In one case, the wireless communication device 102 may determine 718 that an additional subscription 106b has a synchronization channel (SCH) or broadcast control channel (BCCH) collision with the first subscription 106b. In another case, the wireless communication device 102 may determine 720 that an additional subscription 106b has a paging channel (PCH) collision with the first subscription 106b. In yet another case, the wireless communication device 102 may determine 722 that an additional subscription 106b has a neighbor cell acquisition collision with the first subscription 106a. In these cases, the first subscription 106a may preempt the lower priority activities of the additional subscription 106b.

The wireless communication device 102 may prioritize 716 the first subscription 106a SI decoding over the lower priority activities (e.g., SCH/BCCH reading, PCH reading and/or neighbor cell acquisition) of the one or more additional subscriptions 106b. This may include performing four consecutive decodes of the same TC 120 by the first subscription 106a before performing the lower priority activities of an additional subscription 106b. The first subscription 106a may then enter 708 a camped state.

Figure 8:
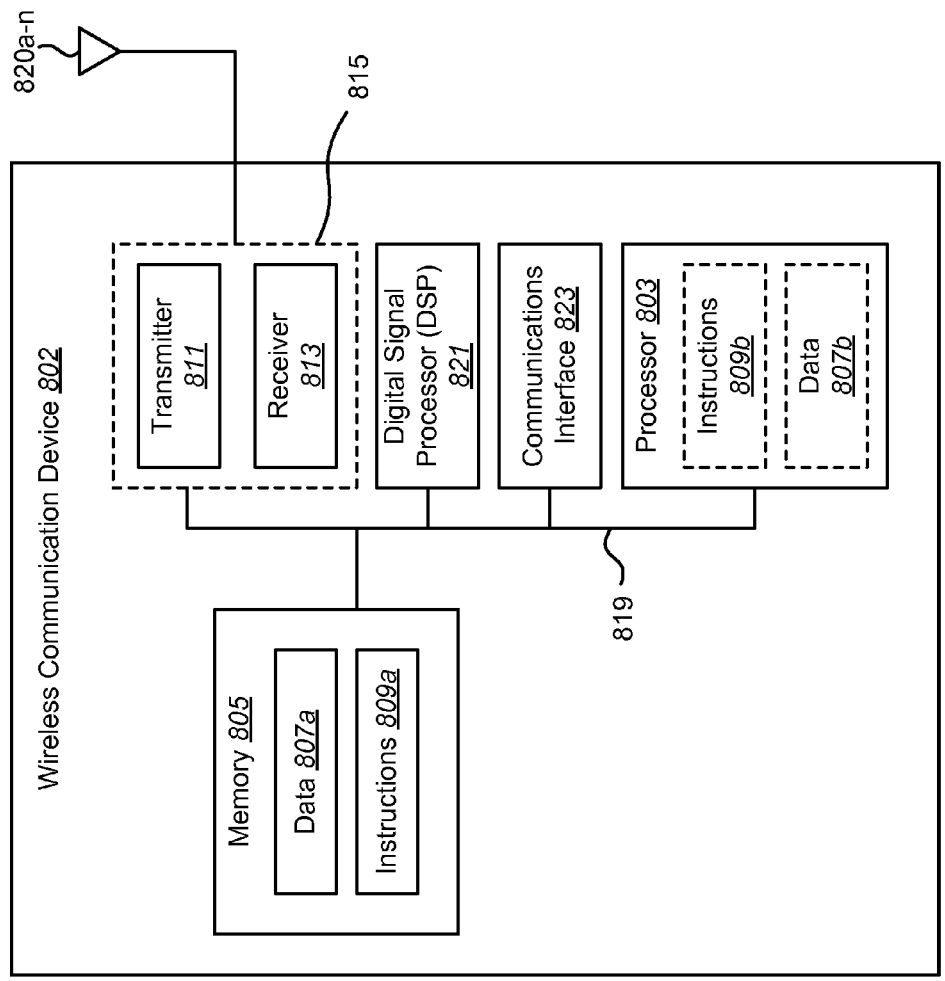
FIG. 8 illustrates certain components that may be included within a wireless communication device according to some embodiments.

FIG. 8 illustrates certain components that may be included within a wireless communication device 802 according to some embodiments. The wireless communication device 802 may be implemented in accordance with the wireless communication device 102 described above. The wireless communication device 802 may be an access terminal, a mobile station, a user equipment, etc. The wireless communication device 802 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the wireless communication device 802 of FIG. 8, in an alternative configuration, a combination of processors (e.g., an ARM and DSP) could be used.

The wireless communication device 802 also includes memory 805. The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, erasable programmable read-only memory (EPROM), electrically erasable PROM (EEPROM), registers and so forth, including combinations thereof.

Data 807a and instructions 809a may be stored in the memory 805. The instructions 809a may be executable by the processor 803 to implement the methods disclosed herein. Executing the instructions 809a may involve the use of the data 807a that is stored in the memory 805. When the processor 803 executes the instructions 809a, various portions of the instructions 809b may be loaded onto the processor 803, and various pieces of data 807b may be loaded onto the processor 803.

The wireless communication device 802 may also include one or more transmitters 811 and receivers 813 to allow transmission and reception of signals to and from the wireless communication device 802. The transmitter 811 and receiver 813 may be collectively referred to as a transceiver 815. Multiple antennas 820a-n may be electrically coupled to the transceiver 815. The wireless communication device 802 may also include (not shown) multiple transmitters, multiple receivers, multiple transceivers and/or additional antennas.

The wireless communication device 802 may include a digital signal processor (DSP) 821. The wireless communication device 802 may also include a communications interface 823. The communications interface 823 may allow a user to interact with the wireless communication device 802.

The various components of the wireless communication device 802 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, FIG. 6 and FIG. 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized. For example, some of the methods described herein may be performed by a processor 803, one or more local oscillators (LOs), a wideband receiver fast Fourier transform (FFT) hardware, software and/or firmware.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication by a multi-SIM wireless communication device, comprising:
    determining time codes (TC) associated with system information (SI) messages for a first subscription;
    determining that multiple SI messages for the first subscription are being sent on the same TC; and
    prioritizing decoding the SI messages for the first subscription when activity of an additional subscription can be preempted.

2. The method of claim 1, wherein prioritizing decoding the SI messages for the first subscription comprises performing four consecutive decodes of the same TC by the first subscription before performing the activity of the additional subscription.

3. The method of claim 1, further comprising determining whether the activity of the additional subscription can be preempted.

4. The method of claim 3, wherein determining whether the activity of the additional subscription can be preempted comprises determining whether the additional subscription is performing a lower priority activity than decoding SI messages.

5. The method of claim 4, wherein the lower priority activity comprises at least one of a synchronization channel (SCH) read, a broadcast control channel (BCCH) read, a paging channel (PCH) read or neighbor cell acquisition.

6. The method of claim 4, wherein when the additional subscription is performing a higher priority activity than decoding SI messages, the method further comprises increasing a system information timer to accommodate four consecutive decodes of the same TC by the first subscription after completion of the higher priority activity by the additional subscription.

7. The method of claim 6, wherein the higher priority activity comprises at least one of a location area update (LAU) and a routing area update (RAU).

8. The method of claim 1, wherein the wireless communication device is a multi-subscriber identity module (SIM) multi standby device, wherein the first subscription is associated with one subscriber identity module (SIM) and the additional subscription is associated with an additional SIM, and wherein each subscription shares a single radio frequency (RF) resource.

9. The method of claim 1, wherein the first subscription is in a system information acquisition state.

10. An apparatus for wireless communication, comprising:
    a processor;
    memory in electronic communication with the processor; and
    instructions stored in the memory, the instructions being executable by the processor to:
        determine time codes (TC) associated with system information (SI) messages for a first subscription;
        determine that multiple SI messages for the first subscription are being sent on the same TC; and
        prioritize decoding the SI messages for the first subscription when activity of an additional subscription can be preempted.

11. The apparatus of claim 10, wherein the instructions executable to prioritize decoding the SI messages for the first subscription comprise instructions executable to perform four consecutive decodes of the same TC by the first subscription before performing the activity of the additional subscription.

12. The apparatus of claim 10, further comprising instructions executable to determine whether the activity of the additional subscription can be preempted.

13. The apparatus of claim 12, wherein the instructions executable to determine whether the activity of the additional subscription can be preempted comprise instructions executable to determine whether the additional subscription is performing a lower priority activity than decoding SI messages.

14. The apparatus of claim 13, wherein the lower priority activity comprises at least one of a synchronization channel (SCH) read, a broadcast control channel (BCCH) read, a paging channel (PCH) read or neighbor cell acquisition.

15. The apparatus of claim 13, wherein when the additional subscription is performing a higher priority activity than decoding SI messages, the instructions are further executable to increase a system information timer to accommodate four consecutive decodes of the same TC by the first subscription after completion of the higher priority activity by the additional subscription.

16. The apparatus of claim 15, wherein the higher priority activity comprises at least one of a location area update (LAU) and a routing area update (RAU).

17. A wireless device, comprising:
    means for determining time codes (TC) associated with system information (SI) messages for a first subscription;
    means for determining that multiple SI messages for the first subscription are being sent on the same TC; and
    means for prioritizing decoding the SI messages for the first subscription when activity of an additional subscription can be preempted.

18. The wireless device of claim 17, wherein the means for prioritizing decoding the SI messages for the first subscription comprise means for performing four consecutive decodes of the same TC by the first subscription before performing the activity of the additional subscription.

19. The wireless device of claim 17, further comprising means for determining whether the activity of the additional subscription can be preempted.

20. The wireless device of claim 19, wherein the means for determining whether the activity of the additional subscription can be preempted comprise means for determining whether the additional subscription is performing a lower priority activity than decoding SI messages.

21. The wireless device of claim 20, wherein the lower priority activity comprises at least one of a synchronization channel (SCH) read, a broadcast control channel (BCCH) read, a paging channel (PCH) read or neighbor cell acquisition.

22. The wireless device of claim 20, wherein when the additional subscription is performing a higher priority activity than decoding SI messages, the wireless device further comprises means for increasing a system information timer to accommodate four consecutive decodes of the same TC by the first subscription after completion of the higher priority activity by the additional subscription.

23. The wireless device of claim 22, wherein the higher priority activity comprises at least one of a location area update (LAU) and a routing area update (RAU).

24. A computer-program product for wireless communications, the computer-program product comprising a non-transitory computer-readable medium having instructions thereon, the instructions comprising:
 code for causing a wireless communication device to determine time codes (TC) associated with system information (SI) messages for a first subscription;
 code for causing the wireless communication device to determine that multiple SI messages for the first subscription are being sent on the same TC; and
 code for causing the wireless communication device to prioritize decoding the SI messages for the first subscription when activity of an additional subscription can be preempted.

25. The computer-program product of claim 24, wherein the code for causing the wireless communication device to prioritize decoding the SI messages for the first subscription comprises code for causing the wireless communication device to perform four consecutive decodes of the same TC by the first subscription before performing the activity of the additional subscription.

26. The computer-program product of claim 24, further comprising code for causing the wireless communication device to determine whether the activity of the additional subscription can be preempted.

27. The computer-program product of claim 26, wherein the code for causing the wireless communication device to determine whether the activity of the additional subscription can be preempted comprises code for causing the wireless communication device to determine whether the additional subscription is performing a lower priority activity than decoding SI messages.

28. The computer-program product of claim 27, wherein the lower priority activity comprises at least one of a synchronization channel (SCH) read, a broadcast control channel (BCCH) read, a paging channel (PCH) read or neighbor cell acquisition.

29. The computer-program product of claim 27, wherein when the additional subscription is performing a higher priority activity than decoding SI messages, the instructions further comprise code for causing the wireless communication device to increase a system information timer to accommodate four consecutive decodes of the same TC by the first subscription after completion of the higher priority activity by the additional subscription.

30. The computer-program product of claim 29, wherein the higher priority activity comprises at least one of a location area update (LAU) and a routing area update (RAU).

* * * * *